(12) United States Patent
Keturi

(10) Patent No.: US 7,257,122 B1
(45) Date of Patent: Aug. 14, 2007

(54) DATA SERVICE IN A MOBILE COMMUNICATIONS NETWORK

(75) Inventor: Joonas Keturi, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 09/403,095

(22) PCT Filed: Apr. 15, 1998

(86) PCT No.: PCT/FI98/00333

§ 371 (c)(1),
(2), (4) Date: Jan. 13, 2000

(87) PCT Pub. No.: WO98/47270

PCT Pub. Date: Oct. 22, 1998

(30) Foreign Application Priority Data

Apr. 16, 1997 (FI) ..................................... 971615

(51) Int. Cl.
- *H04L 12/28* (2006.01)
- *H04L 12/56* (2006.01)
- *H04J 3/16* (2006.01)
- *H04J 3/22* (2006.01)

(52) U.S. Cl. ..................................... 370/401; 370/466

(58) Field of Classification Search ........ 370/464–466, 370/321, 228, 329, 338, 340, 310.1, 310.2, 370/473–4, 401; 709/246, 230; 345/1.1, 345/3.1
See application file for complete search history.

(56) References Cited

U.S. PATENT DOCUMENTS

| | | | |
|---|---|---|---|
| 5,483,531 A | 1/1996 | Jouin et al. ................. | 370/277 |
| 5,717,737 A * | 2/1998 | Doviak et al. .............. | 455/403 |
| 5,742,668 A * | 4/1998 | Pepe et al. .................. | 455/415 |
| 5,894,478 A * | 4/1999 | Barzegar et al. ............ | 370/401 |
| 6,049,821 A * | 4/2000 | Theriault et al. ........... | 709/203 |
| 6,122,263 A * | 9/2000 | Dahlin et al. ............... | 370/329 |
| 6,185,625 B1 * | 2/2001 | Tso et al. ................... | 709/247 |
| 6,421,707 B1 * | 7/2002 | Miller et al. ................ | 709/206 |
| 6,473,609 B1 * | 10/2002 | Schwartz et al. ........... | 455/406 |

FOREIGN PATENT DOCUMENTS

| | | |
|---|---|---|
| EP | 0 777 394 A1 | 6/1997 |
| FI | 963659 | 9/1996 |
| WO | 96/09714 | 3/1996 |
| WO | 97/01940 | 1/1997 |
| WO | WO 9701940 A1 * | 1/1997 |
| WO | 98/11744 | 3/1998 |

OTHER PUBLICATIONS

David R. McClanahan: Publish Dynamic Applications on the Web, Databased Wed Advisor, Apr. 1997, pp. 60-65.

* cited by examiner

*Primary Examiner*—Kevin C. Harper
(74) *Attorney, Agent, or Firm*—Pillsbury Winthrop Shaw Pittman LLP

(57) ABSTRACT

A server of a telecommunications systems including first mechanisms for connecting to a mobile communications system which in turn connects to terminals on a radio connection, and second mechanisms for connecting to another telecommunications systems of the Internet type. According to the invention, the server is thus arranged to receive commands from the terminals and convert them into a format compatible with at least one of the protocols of the other telecommunications system; and to receive information from the direction of the other telecommunications system and to convert it into a format compatible with at least one protocol of the mobile communications system.

16 Claims, 3 Drawing Sheets

| KEYWORD | URL |
|---|---|
| BUS | WWW.BUS.COM/TIMETABLE |
| WEATHER | WWW.FORECAST.FI |
| FLIGHT | WWW.FINNAIR.FI |
| RATE | WWW.REUTERS.COM |
| MOVIES | WWW.RADIOCITY.FI/MOVIES |

DATA SERVICE IN A MOBILE COMMUNICATIONS NETWORK

BACKGROUND OF THE INVENTION

The invention relates to providing services for mobile subscribers especially in the Internet.

To keep the specification illustrative, the invention is described in connection with the Internet. It is impossible to limit or define the Internet accurately. In the context of this application the Internet refers to any combination of a plurality of networks which comprise a plurality of servers and in which several protocols are used, in particular HTTP and TCP/IP and their enhancements.

Referring to FIG. 1, a user of a basic mobile station MS has so far had few possibilities of fetching information via data networks. A mobile subscriber who has a simple mobile station without a connection to a computer can call to a service number which is specific to each service and in which the requested service is provided. An example of such a service is the weather forecast for seafarers provided by the Meteorological Institute in Finland. The mobile subscriber may for example choose that the weather forecast is transmitted to his mobile station four times a day. From the service provider the information is sent via the public switched telephone network PSTN to the short message service center SMSC of a mobile communications system 2, from which it is forwarded to the mobile station MS of the person who requested the service.

There are several problems associated with the prior art mechanisms. A user of a basic mobile station does not have any possibility of utilizing the services provided via the Internet. Utilization of a service requires that the service provider provides the service via a mechanism supported by the mobile communications system, usually as short messages. Even when the users of basic mobile stations are provided with services in the form of short messages, the content of such services is usually older or less comprehensive than the content of services provided for those using the services via a personal computer and the Internet. In telecommunications via the Internet the user's location is not usually transmitted to the service provider, but the service user dependent on the location has to inform the service provider of his location separately. Furthermore, the user has to select each separate service via a separate service number.

A further problem is that provision of services is dependent on the operator selected. The above-mentioned weather forecast for seafarers, for example, is available in the network of only one mobile operator in Finland. Furthermore, usually no information is transmitted to the service provider on the type of the terminal used by the mobile subscriber. For example, the above-mentioned weather forecast for seafarers could be sent as a weather chart in the form of a picture, provided that the terminal comprises a graphical display and information on the existence and properties of the graphical display could be transmitted to the service provider.

By connecting a mobile station MS to a personal computer PC it is possible to make all data network services available. FIG. 2 illustrates a simplified architecture of such an arrangement. The user of a computer PC feeds commands (address of a www page, such as www.nokia.com) into his browser. This interprets the command and concludes whether the user wants to fetch a www page, read or send electronic mail, or transfer files, etc. Depending on the command given by the user the browser sends a command via different protocol layers over the air interface Um via the mobile communications system 2 to the public telecommunications network PSTN, thorugh which the connection to the Internet is established. When information is sent from the Internet to a computer PC, the browser interprets on the basis of the protocol layer used whether there is mail for the user or a www page in the form of a HTML code, for instance. The browser shows the information on the display of a computer PC to the user according to the nature of the information.

Connecting a computer with a mobile station is an expensive solution, which also requires a lot of space. New kinds of communication means, such as the Nokia Communicator 9000, have come onto the market recently. In FIG. 1 the device denoted by SP ("Smart Phone") illustrates such communication means. With respect to its overall size and data processing resources such an integrated device is a compromise between a basic mobile station and a computer connected to a mobile station. Its programs are not compatible with personal computers produced according to industrial standards, and thus it is not possible to employ the same telecommunications programs and applications in it as in the computers produced according to the industrial standards.

As the resources of a mobile terminal are increased (e.g. by connecting or integrating a computer and a mobile station), the risk of receiving viruses or other undesirable programs to the mobile terminal increases. In addition to viruses, there are other kinds of undesirable programs known as cookies, which in addition to a useful service also transmit information on the user's terminal, its operation, etc. to the network. Such terminals may have enough resources for storing undesirable cookies, but they usually lack sufficient resources for detecting or eliminating them.

In the field of mobile communications it has been a general tendency to solve these problems by increasing the intelligence of mobile stations. One example of an advanced mobile station is the above-mentioned Nokia Communicator 9000. It is not, however, possible to solve all the above-mentioned problems satisfactorily by only introducing new, more intelligent mobile stations into the market. One problem associated with this approach is that at the moment there are tens of millions of almost new mobile stations on the market, and their users are understandably unwilling to invest in new devices. One of the operators problem is the vicious circle which emerges when the users do not invest in new devices until there is a sufficient number of services available to them. On the other, it is not profitable for the operator to provide new services until there is a sufficient number of terminals capable of utilizing these services on the market.

BRIEF DESCRIPTION OF THE INVENTION

An object of the invention is to develop a mechanism for providing mobile subscribers with at least some services of a wide Internet-type telecommunications network which utilizes several protocols so that a mobile subscriber has a plurality of services available during one session and via one telephone number. An object of the preferred embodiments of the invention is to solve other problems mentioned above. The objects of the invention are achieved with a method characterized by what is stated in the independent claims. The dependent claims relate to the preferred embodiments of the invention.

The invention is, first of all, based on the conception that new services can be provided at such a fast pace that there is no prior art mechanism which would allow to transfer the software required by the new services to existing computers and advanced mobile stations at reasonable costs. Secondly, the invention is based on the idea that it is in practice impossible to maintain information in a standardized equipment register El of the GSM type so that when a new device or feature is introduced, the equipment registers of all operators would have a data field ready indicating whether the old and new network equipment support the new feature or not. Thus it is best to find out dynamically, i.e. at the beginning of a session or during it, which features each terminal supports.

Furthermore, the invention is based on the idea that it is not cost-effective even to try to maintain effective browsers in mobile terminals. As it is known, browsers are the fastest developing programs on the market at the moment. It is difficult to maintain them even in an ordinary computer to which a CD-ROM reader has been connected. It is more difficult to update browsers than for example a word processing program since different users may, for example, connect to the Internet via different service providers (Internet operators), and at least they have different codes and passwords. After an update a browser also has to be configured according to each user's personal parameters. Furthermore, in problem situations, i.e. when no connection can be established, it is difficult to obtain information on the cause of the problem from browsers. Maintenance of browsers in different mobile terminals and mobile stations would lead to a situation in which there would be an enormous number of different terminals in use the resources and software versions of which (calculation rate, memory size, display size, keyboard type, etc.) would be different. The more an organisation has mobile terminals, the worse the problem would be. Therefore, according to the invention, the browser (and other applications, such as mail processing) is transferred from a mobile terminal to the network side. Substantially only information on the user interface of the mobile terminal is transmitted over the air interface. According to preferred embodiments of the invention, information on the user interface is tailored (filtered and compressed) so as to make it more suitable for the limited resources of the mobile terminals. The essential principle is to do as much as possible on the side of the fixed network and as little as possible in mobile terminals.

BRIEF DESCRIPTION OF THE DRAWINGS

In the following, the invention will be described more closely by means of preferred embodiments with reference to the accompanying drawings, in which.

DETAILED DESCRIPTION OF THE INVENTION

Figure 3:
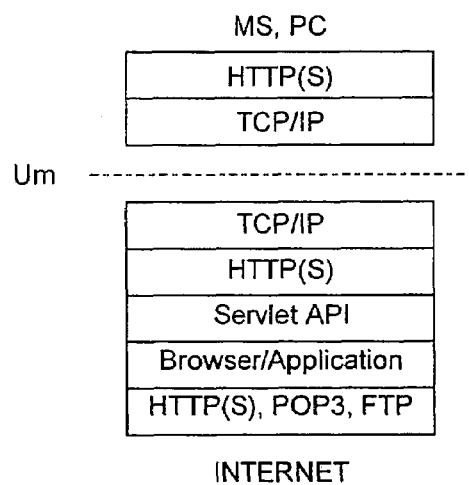
FIG. 3 illustrates a mechanism of the invention for browsing the Internet from a mobile terminal.

FIG. 3 illustrates the architecture of the arrangement according to the invention in principle. The browser and other applications have been transferred to the side of the fixed network from a mobile terminal, and the function of the mobile terminal is to substantially function as a remote control of the application.

Figure 1:
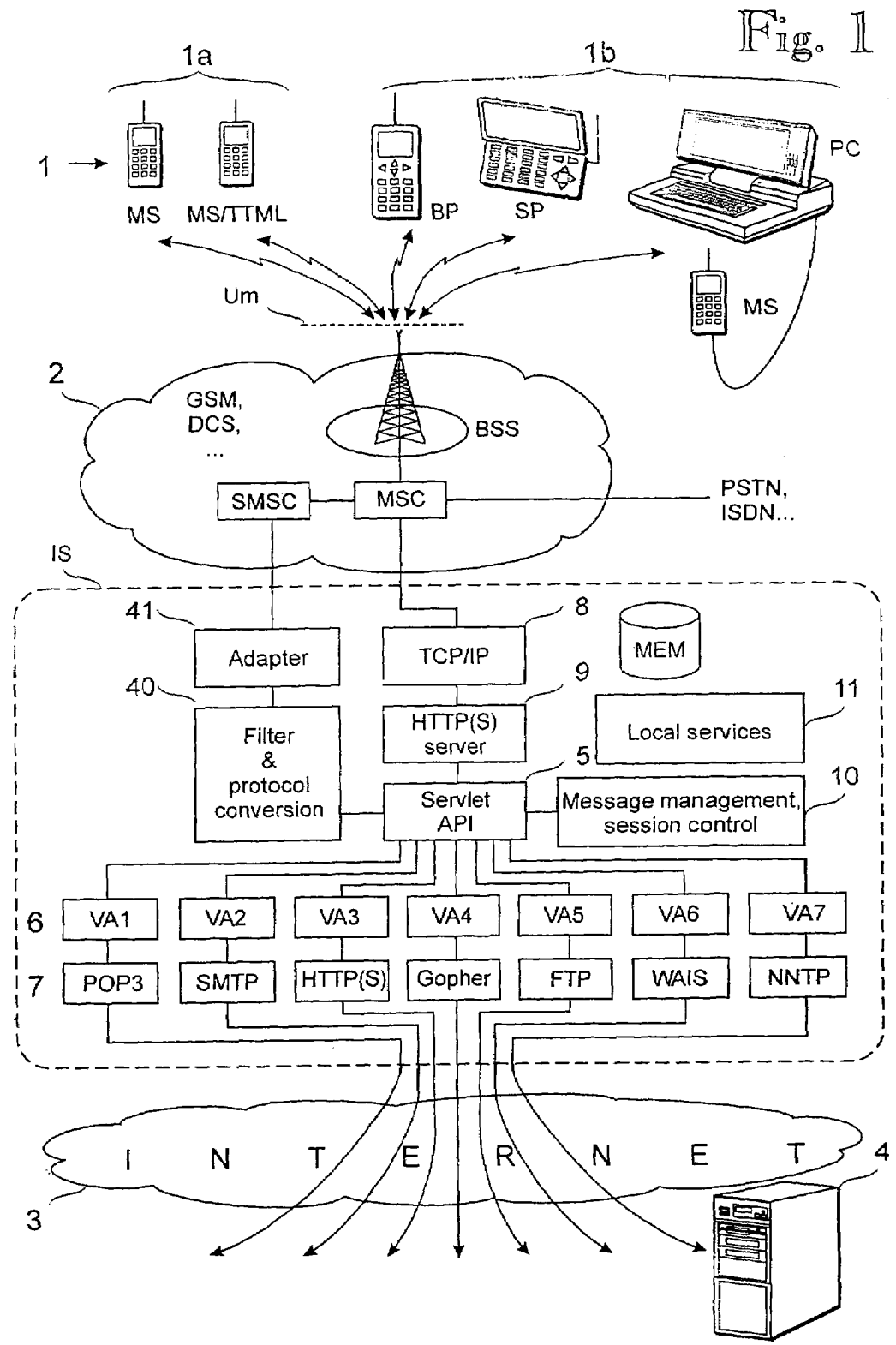
FIG. 1 illustrates relevant parts of the telecommunications system and an information server of the invention.
Figure 2:
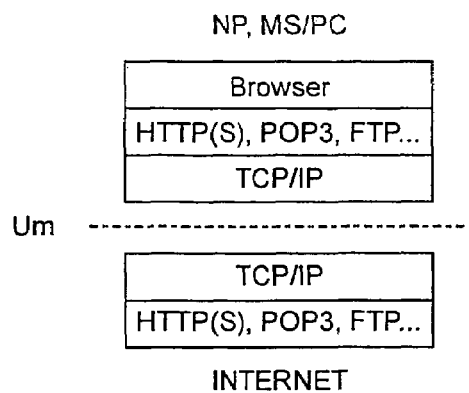
FIG. 2 illustrates a prior art mechanism for browsing the Internet from a mobile terminal.

Referring to FIG. 1, we shall describe preferred embodiments of an information server according to a preferred embodiment of the invention. To keep the specification illustrative, the information server IS is described as a single compact unit, but this is, however, not the only conceivable embodiment. The functions of the invention can be distributed among one or more existing network elements the software of which is supplemented in the manner of the invention.

The following names are used for the terminals of different types. The boundaries between the types are not necessarily clearly defined, but the names are adequate for illustrating one of the basic ideas of the invention according to which the type of the terminal is recognized and the service provided for the subscriber is tailored on the basis of the terminal type.

"A basic mobile station" (MS in the figures) refers to a mobile station which is provided with the basic features of the mobile communications system in question. In the case of the GSM system used as the example such a mobile station could be a Nokia 2110, which in addition to speech can transmit and receive short messages.

"An interpreter phone" (MS/TTML) comprises an interpreter of a suitable protocol, e.g. a TTML interpreter, which can draft forms of www pages written in the form of a TTML code. An example of such a mobile station is the Nokia 8110i.

"A browser phone" BP comprises a user interface for browsing www pages. An example of such a mobile station is the PocketNet Phone produced by AT&T.

"A smart phone" SP comprises simplified versions of typical office applications, such as word processing and spreadsheet programs. The smart phone also has a memory for storing data. At least some of the applications of the smart phone can be used even when the mobile station is not in radio connection with the mobile communications system. An example of such a smart phone is the Nokia Communicator 9000.

"A personal computer" PC refers to a computer for general use which is in radio connection with a mobile communications system. The radio connection can be implemented by using, for example, a basic mobile station provided with a data interface, or a mobile station in the form of a PC card, or a radio modem which needs no user interface of its own.

This division (MS; MS/TTML; BP; SP; PC) is only one possible division. FIG. 1 also illustrates a simpler division in which terminals 1 are divided into two classes only. Terminals of class 1b support the HTTP protocol and terminals of class 1a do not support it. To the latter the information received from the Internet can be transmitted in the form of short messages, as will be described in greater detail below.

Implementation of the Information Server IS

In FIG. 1 an information server IS according to a preferred embodiment of the invention forms a bridge between a mobile communications system 2 and the Internet 3. The information server IS connects to the mobile communications system 2 via necessary adapters and protocol converters. This adaptation may be completely conventional. In the lowest layers of the OSI model the protocols of the mobile communications system are used, and most advantageously HTTP(S) and/or TCP/IP protocols in the upper layers. HTTP(S) refers either to the HTTP protocol or to its ciphered version HTTPS. A HTTP(S) server 4 converts the information provided by the Internet 3 into a format supported by the mobile stations 1. For example, an HTML coded page provided by a server 4 of the Internet 3 is converted into a TTML code. The TTML is a subset of the HTML page-description language. It utilizes the standard character set but no graphics. It enables creation of menus and forms on the display of a mobile station. A www page in this format can be already loaded into a basic mobile station. Some of the mobile stations that have newly come onto the market have a ready-installed TTML interpreter which can draft forms of a www page written in the form of a TTML code.

The block "Serviet API" 5 (Server applet applications applications programming interface) is a software interface between the different modules of the information server IS. Terminals that lack the capability of communicating via the HTTP protocol can be supported by a short message service center SMSC. The function of this branch will be described later on.

According to the invention, a client application 6 and a client protocol 7 are installed in the information server IS of the fixed network (instead of a mobile terminal). Virtual applications 6 (VA1 . . . VA7) receive commands from the user of the mobile station 1 and convert them into a format compatible with the different protocols of the Internet 3. In the reverse direction, they receive information from the Internet 3 and convert all protocols of the Internet into a HTTP protocol. One example of such protocol-conversion is given in Reference 1. Reference 1 describes how it is possible to direct dynamic database searches to the Internet by means of protocol conversions, but it is assumed in Reference 1 that the necessary protocol conversions are performed in the user's terminal. In the mobile communications system it is not possible to make such an assumption (mainly because of the above-mentioned reasons related to security and resources). Another example of such a protocol conversion is given in Reference 2. On the priority date of the resent application Reference 2 will not be a public document, and thus the essential parts of its content will be cited in connection with the examples of short messages.

The information server IS of the invention contacts the servers 4 of the Internet by means of its client applications 6. Using the HTTP protocol, there is a connection from portable computers PC or smart phones SP to virtual clients via data calls, and thus in this case a portable computer or a smart phone in a way functions as a remote control of virtual applications 6. A portable computer or a smart phone provides the user with a simple and well-known user interface.

FIG. 1 illustrates client applications for some Internet protocols. A HTTP(S) server 9 can independently call some Internet protocols, i.e. to convert information between the protocols of mobile stations and the protocols of the Internet. This procedure can be performed especially in connection with HTTP(S), Gopher, FTP and WAIS protocols. In this case a separate client application 6 and an adaptation layer 7 are not necessary, but they enable provision of supplementary services. On the other hand, considering the nature of electronic mail protocols POP3 and SMTP, it is easier to implement the invention in the manner described above (and in FIG. 1).

Furthermore, the HTTP(S) server 9 advantageously comprises a proxy, the function of which will be described later on.

The information server IS determines best itself the parameters of the terminal 1 which are relevant to the invention. The most important parameter is the terminal's ability to support protocols other than the short message service of the mobile communications system 2. The information server IS obtains this information for example from the headers of the protocol frames, and thus it is not necessary to interrogate the equipment register of the home network. Alternatively, the type of the terminals can be determined so that a telephone number of its own is reserved for each terminal type. In FIG. 1 division of mobile stations into different types is illustrated so that mobile stations of type 1*b* support the HTTP protocol and mobile stations of type 1*a* do not support it. Each virtual application may contain ready-programmed alternative protocols via which an attempt is made to establish a connection to the terminal if the connection cannot be established via the primary protocol. Alternative protocols (short message, data call) are used if the user's terminal does not support the primary protocol (e.g. HTTP), or the user's computer is switched off, or the user has roamed to another operator's area where he can be reached only via the short message service or a data call.

According to a preferred embodiment, the information server IS utilizes the location information on the terminal 1 provided by the mobile communications system 2. Location information can be utilized e.g. by selecting the received information or filtering it to the area corresponding to the user's location. For example, weather forecasts, timetables of public transport and movie programmes can be at least first restricted to the area where the user is at a given time. In this context selection or filtering can be carried out e.g. in such a manner that the application forms an inquiry and the user's location is included in the conditions of the inquiry. An example of this is a situation in which the user types an inquiry "movies today" and the information server IS may form an inquiry www.programs.com/cinemas?city=xx, where xx corresponds to the city where the user is. Alternatively, the information server IS may receive information independent of the location from the Internet and filter only the piece of information related to the user's location to the user.

According to a preferred embodiment, the information server IS comprises a message manager 10, which forms data calls as robust links. The message manager 10 is a kind of transmission layer between the client and the server.

In the Windows NT environment of the example robust links can be implemented by using as interfaces the Windows 2 socket interface. When a call is disconnected, the message manager re-establishes the connection. In order to avoid re-establishing the interactive connection or transmitting a file from the beginning after the break, the message manager stores the state of the user interface of the terminal and in the case of file transmission transfers only the data blocks the terminal has not acknowledged as received.

An example of an especially secure protocol is the secure tunneling protocol SSL which is generally used in the internal Intranet networks of companies. As it is known, Intranet networks can be technically implemented as part of the Internet part of which has been secured with passwords and authentication procedures.

According to a preferred embodiment, the information server IS maintains many priority classes and processes information on the basis of priority. Priority is most advantageously connection-specific and application-specific, whereby the same user's interactive application can use a higher priority (and receive quicker service) than e.g. file transmission occurring at the background.

The information server IS comprises a memory MEM which is used (in addition to the conventional functions of the computer system) as an intermediate memory for different telecommunications connections. The intermediate memory of the hard disk (cache), the function of which is to store areas read from the slow mass memory in the quick central memory, is known from conventional computer systems. Proxy servers, the function of which is to store last-read Internet pages in the local memory, are known from the Internet. The cache memory of the information server IS could be implemented using this conventional technology in which, for example, the criterion for storing a certain www page in the cache memory is simply the point of time when a user has read the page in question last. However, if the size of the cache memory is very small compared with the total number of the www pages (which is usually the case), numerous different users can request so many different www pages that there is no time to re-read any of the pages until the page is deleted from the memory of the interworking server so as to provide space for new pages.

Use of the cache memory is more effective than in the prior art systems if it is determined which pages are read most frequently, and the addresses of these pages are stored in a list, and the pages on the list are stored in the cache memory. Several magazines in the field even publish statistics on the most-read www pages. The information server IS can be, however, provided with program routines which compile statistics on the popularity of different www pages and automatically update the list of the most popular pages. The maximum time after which a www page is re-read may be defined for the cache memory so that the possible updates of the page can be taken into account.

Another advantageous use of the cache memory is prefetch of information. This can be implemented in such a manner that a virtual client 6 searches for links to subsequent pages on a www page and prefetches these pages into its memory while the user reads the previous page.

The information server IS can be physically implemented by means of conventional technology related to computers and local area networks. Applicable technologies include computers based on the Intel Pentium® line of processors and Windows® NT operating system, which allow the equipment to be scaled easily. Functions of the invention can be implemented by means of most www server programs which support e.g. the Java language.

Use of the Internet by Means of Short Messages

According to a preferred embodiment of the invention, services of the Internet are used with a mobile station supporting the short message service as follows: 1) transmitting via the mobile communications network a short message containing an identifier which indicates the World Wide Web (www) page in the Internet to a short message service center which has a direct access to the Internet via a computer terminal connected to the service center. 2) communicating toward the Internet using the protocols of the Internet and fetching the www page indicated in the short message or part of it. 3) converting the relevant part of the content of the www page into a short message. 4) transmitting a short message to the mobile station via the mobile communications network. 5) showing the content of the short message on the display of the mobile station.

The short message service center SMSC of a digital mobile communications system of the preferred embodiment of the invention comprises means for connecting to a mobile communications network for transmitting short messages between the short message service center and mobile stations, and means for connecting to a data network (Internet). A data network connection comprises means for fetching World Wide Web (www) pages from the Internet using the protocols of the Internet in response to the short message which is sent by the mobile station and either directly or indirectly indicates the www page, and the short message service center further comprises means which convert the relevant part of the content of the www page into a short message which is sent to the mobile station via the mobile communications network.

An apparatus according to the invention for connecting the short message service center of a digital mobile communications system to a data network of the Internet type comprises means for fetching World Wide Web (www) pages from the Internet using the protocols of the Internet in response to the short message which is sent by the mobile station to the short message service center and indicates said www page, and means which convert the relevant part of the content of the www page into a short message which is sent to the mobile station via the short message service center and mobile communications network.

A mobile subscriber fetches information from www pages using the short message service of the mobile communications network. For this purpose, the short message service center or another apparatus linked with it is connected to the Internet and uses HTML, HTTP and TCP/IP protocols toward the Internet. Furthermore, the short message service center is connected with the mobile communications system in the normal manner, i.e. short messages are transmitted between the short message service center and mobile stations in the way defined for the mobile communications system.

When a mobile user wants information from a certain www page from the Internet, he sends a short message containing an identifier which either directly or indirectly indicates the www page in question to the service center. A direct indication includes the address of the www page, URL, for instance. URL addresses are usually rather long and difficult to remember, and it is not always practical to transmit them to the service center in a short message. In one embodiment of the invention the mobile station sends, instead of the address, a short identification code which indirectly indicates the requested www page. The short message service center or another apparatus comprises a table in which the codes and the www page addresses can be linked with each other.

Having received the short message the short message center or another apparatus contacts the desired www server via the Internet and receives the www page from it and stores the page.

The length of a short message is limited, e.g. to 160 characters, whereas a www page may contain an enormous amount of information. It is advantageous to provide the short message service center (or another apparatus) with means which convert or compress the www page received from the Internet into a format suitable for the transmission capacity of the short message service of the mobile communications system. Alternatively, the short message service center (or another apparatus) separates or filters only the relevant part of the www page and sends it to the mobile station in a short message. The part of the www page containing relevant information can be identified on the basis of a predetermined fixed criterion which is common to all subscribers, or is based on a criterion received from the mobile station, such as a keyword. This keyword may be included together with the www page identifier in the short message sent by the mobile station. The short message service center or another apparatus searches the received and stored www page for the section which contains the relevant information and includes it in the short message. The length of the text to be included in a short message may be limited for example with character strings used on the www pages, such as HTML tags. Thus it is possible to include for example the paragraph of the www page containing the requested information in the short message.

The mobile station receives and processes the Internet short message from the short message center as a normal short message. The short message can be shown on the display of the mobile station in the normal manner. Thus the mobile station does not need to have any data transmission properties or www browsers for using the www service of the Internet. The only technical requirement is that the mobile station has the conventional short message function.

Communication of the invention via the short message service can be applied in all mobile communications systems that support circuit-switched speech and data services and have a short message service available. In this context short message service refers to sending of a short text message between a mobile station and a special short message service unit without needing to establish a point-to-point traffic route. Short message transmission is limited to one message, in other words, transmission of one message constitutes the whole transmission act. Thus the short message service is completely different from packet-switched data transmission.

The short message service is considered to be prior art technology to one skilled in the art. As regards a more detailed description of the GSM system, reference is made to the GSM specifications (in particular to GSM 03.40) and *The GSM System for Mobile Communications*, M. Mouly & M. Pautet, Palaiseau, France, 1992, ISBN:2-9507190-0-7.

A mobile originated (MO) short message transmission and a mobile terminated (MT) short message transmission are defined as different services. MO short messages are transmitted from a mobile station to the short message center SMSC. These short messages may be directed to other mobile users or to subscribers of a fixed network. MT short messages are transmitted from the short message center SMSC to terminals. These short messages may have entered the short message center SMSC from other mobile users or from other sources. The protocol used between the SMSC and the terminals is called SM-TP (Short Message Transport Protocol). The short message center SMSC is given an ISDN number of its own in the numbering domain of the GSM network, and using this number the mobile station can direct a short message to the SMSC.

The short message service center SMSC is connected to the Internet 3 so that it can be used as a gateway between the GSM network and the Internet. The connection of the short message center SMSC to the SMSC center may be a direct connection, or the SMSC can be connected to a separate computer apparatus which has an access to the Internet 3.

Figure 4:
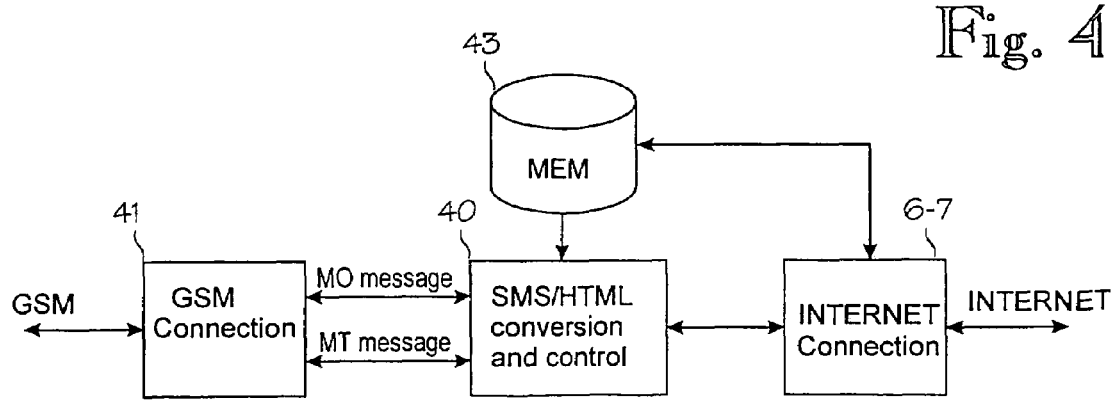
FIGS. 4 to 6 illustrate a preferred embodiment of the information server of the invention for browsing the Internet from a mobile station that supports the short message service.

The block diagram of FIG. 4 illustrates a short message center of the invention by way of example. The connection 41 between the GSM network and the short message center SMSC may be similar to that in the existing short message service centers.

The short message center SMSC uses HTTP and HTML protocols toward the Internet 3. The HTTP protocol in turn uses TCP/IP interfaces. There are www server programs and client programs commercially available for different operating systems (such as Unix), which can be used in the computer (computers) of the service center SMSC to carry out fetches of www pages from the Internet according to the HTTP and HTML protocols. In FIG. 4, the Internet connection block 6-7 represents these Internet-specific functions of the short message center SMSC.

Fetches of www pages via the Internet connection 6-7 as well as transmission and reception of short messages via the GSM connection 41 are controlled by the conversion and control unit 40. The function of the control unit 40 is to convert a short message received via the GSM connection into a fetch of a www page to be carried out via the Internet connection. Correspondingly, the control unit 40 filters the relevant part of the fetched www page, and this part is included in the short message and sent to the mobile station via the GSM connection. The short message center further comprises a database 43 in which the fetched www pages are stored as well as different parameters, conversion tables, etc. needed by the control unit.

If the short message center SMSC is connected to the Internet by means of a separate computer apparatus, the functional blocks of FIG. 4 may be divided between the short message service center SMSC and the computer. The GSM connection 41, for example, may be a normal short message service center, whereas the control unit 40, Internet connection 6-7 and memory (database) 43 are located in a separate computer. This is an advantageous alternative especially when the service of the invention is added to old short message service centers.

Figures 5, 6:
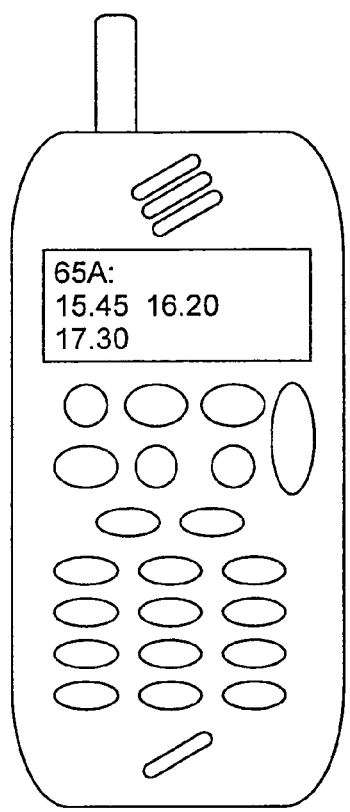

When a mobile user wants to receive information from a www page, he sends a short message which is directed (ISDN number) to the short message service center SMSC and includes an identifier which directly or indirectly indicates the www page in question. A direct indication includes the address of the www page, URL, for instance. Examples of URL addresses are http://www.nokia.com and http://www.uspto.gov. (In most browsers it is not necessary to type the http:// part, wherefore it will not be repeated in the following.) In one embodiment of the invention the user types, instead of the URL address, a short identification code in the short message. This code indirectly indicates the requested www page. In the database 43 of the short message center SMSC there is a table in which the identification codes and he www page addresses can be linked with each other. FIG. 5 illustrates such a table. For example, if the user wants to receive information on bus timetables from the www page the URL of which is www.bus.com/timetable, he sends a code BUS to the short message center SMSC in a short message. For the sake of simplicity the conversion table of FIG. 5 illustrates only one identification code which is related to a certain www page. It is advantageous to include several alternative identification codes (e.g. "films", "movies" and "cinemas") which relate to the same www page in the conversion table. It is also advantageous to fetch the user the www page he selected, even though the user would feed only part of the identification code.

The short message is transmitted to the short message center SMSC as a normal MO message. Having received the short message the GSM connection unit 41 transmits the content to the control unit 40. The control unit 40 fetches the URL address from the table on the basis of the identification code. Then the control unit 40 advantageously checks whether the www page in question has been fetched earlier and stored in the database 43. If the page is not found in the database 43, the control unit 40 fetches the www page corresponding to the URL address from the Internet via the connection 6-7 and stores it.

The length of a short message is limited, e.g. to 160 characters, whereas a www page may contain an enormous amount of information. The user is often interested only in a certain piece of information which is hidden among other data. For this reason, the control unit 40 in the preferred embodiment of the invention separates or filters only the relevant part of the www page and sends it to the mobile station in a short message.

The HTML language which describes www pages consists of tags which are put in angle brackets < > in a text. Such codes include a paragraph code <P>, title code of a page <TITLE>, change of the paragraph <P> or <BR>, list <UL>, etc. These HTML codes appearing on www pages can be used for determining the size of the text to be included in a short message. Alternatively or in addition, it is possible to use other arbitrary character strings. Thus it is possible to include e.g. the paragraph the www page which contains the desired relevant information (the text between two <P> codes) in the short messge. Use of standard HTML codes as templates allows the short message service to utilize all existing www information without any changes or with minor changes to the www pages. Furthermore, in the invention a HTML text is converted into a readable format before the transmission. The text is also compressed by leaving unnecessary white fields out of the text. HTML tables are converted into separate paragraphs.

The part of the www page containing relevant information can be identified using a predetermined fixed criterion which is common to all subscribers or based on a criterion received from the mobile station, such as a keyword.

For example, a short message the keyword of which is WEATHER leads to fetching a www page containing weather forecasts from the Internet. When a fixed criterion is used, it is possible to extract, for example, the paragraph on the following day's weather.

When a keyword or another search text is used, the www page is searched for the corresponding text which is within the predetermined HTML codes. This corresponding text block is then transmitted to the mobile station in a short message (usually in a format converted from the HTML language into a readable language). A mobile user may include a search word in the short message in which he asks for information from a www page.

The MS may for example send an inquiry BUS 65A in a short message. The control unit of the short message center SMSC retrieves the URL address www.bus.com/timetable corresponding to the code BUS from the database. Then the control unit checks whether the www page corresponding to the URL already exists in the database. If the page is not found, the conrtol unit 40 fetches the www page in question from the Internet 3 through the connection 6-7 and stores it in the database 43. The stored www page could look like the following, for example:

<BODY>
<P> Bus Company Limited Timetable </P>,
<P>64: 14.45 15.10 15.30 15.55</P>
<P>65A: 15.45 16.20 17.30>/P>
</BODY>
<HTML>

The control unit 40 searches the www page for the paragraph in which the keyword 65A appears and deletes unnecessary information. Thus the short message to be sent to the mobile station MS would look like the following:

65A: 15.45 16.20 17.30

The control unit 40 sends this short message through the GSM connection 41 to the GSM network where it is transmitted to the mobile station as other short messages. The MS receives and processes the Internet short message from the short message center as a normal short message. The short message can be shown on the display of the mobile station in the normal manner, as FIG. 6 illustrates.

It is also possible to use www pages which comprise inquiry scripts, i.e. question clauses drafted using a command language. In other words, the www server maintaining the www page already filters the relevant part from the www page on the basis of the inquiry sent to it and trannsmits the relevant part as a www page to the short message center SMSC. The short message center has to have information on the inquiry format of each www page (service). Furthermore, the mobile subscriber should know all the keywords for the inquiries. Functionality of this kind would enable more accurate fetches.

When a mobile user sends a short message containing the inquiry BUS 65A, the SMSC could send an inquiry www-.bus.com/timetable?bus=65A to the server of the www page www.bus.com/timetable. The www server forms a reply on the basis of the inquiry parameters and the inquiry script of the www page, and the reply is sent back to the short message center SMSC via the Internet 3 in the HTML format. A reply from a www server could look like the following:

<BODY>
Timetable for bus 65A:
15.45 16.20 17.30
</BODY>
<HTML>

The control unit 40 of the short message service center SMSC cleans the reply and converts it into a readable text format, and the final short message looks like the following:

Timetable for bus 65A: 15.45 16.20 17.30 The foregoing describes cases in which the control unit 40 sends only the relevant part of a www page in a short message. In another embodiment of the invention the control unit also has an optional mode in which it does not search only for the relevant part of a www page, but sends the entire www page, although a cleaned version of it: an HTML text is converted into a readable format and unnecessary empty fields are deleted to compress the text and to reduce the size of the message. This corresponds to the action performed in the last example cited above.

In a further embodiment of the invention the control unit 40 has an optional mode in which the content of a www page is sent in the HTML format in a short message. Only empty fields are deleted in order to reduce the size of the short message.

Use of Electronic-Mail

Function of a preferred embodiment of the invention will be described using reception of electronic mail as an example. Electronic mail can be received from mail servers (not shown separately) by different subscriber devices the most advanced ones of which can communicate with mail servers via a data call using the TCP/IP protocol. It is possible that a PC user, i.e. subscriber A, has sent an e-mail message to a subscriber B from his computer, but when subscriber B replies, the subscriber A's computer PC is switched off and only his mobile station MS is on. In that case the information server IS detects that the subscriber A's terminal MS responds to the page of the mobile communications system, but the information server IS cannot establish a connection to the computer PC via the TCP/IP protocol. In this case, according to a preferred embodiment of the invention, the information server IS sends a short message to subscriber A via the short message center SMSC.

In the case of the GSM system used as an example the length of a short message is 160 characters. E-mail messages longer than this can be sent—up to a certain limit—by chaining a few short messages one after another. Mobile stations have a limited capacity of storing short messages. It is advantageous to limit the number of short messages to be chained to a few messages, e.g. 2 to 5 short messages. If an e-mail message is longer than this, only part of it can be sent as a short message (e.g. said 2 to 5 messages of 160 characters). E-mail users could include the most important parts of their messages in the beginning of the messages. Alternatively, it is possible to send only a notice in a short message that the user will receive e-mail as he switches his computer on.

SUMMARY OF THE INVENTION

According to the preferred embodiment, an information server IS of the invention has three main functions: connection functions, billing management and local services. Connection functions comprise robust links, multi-client support and multi-protocol support. Multi-client support means e.g. that information is displayed according to the varying resources of different terminals ("basic mobile stations", "smart phones"). Multi-protocol support means that processing of the application protocol is carried out on the server side and the Internet protocols are converted into the HTTP in the server. Robust links mean e.g. continuation of the connection after a break. This block also comprises optimization of the transmission path (e.g. multiplexing), which means for example that when a user reads www pages, mail, etc. can be transferred at the background. This function may also comprise intelligent prefetch of information from the Internet. A further advantageous function is priority management, which in practice means that messages related to payments can be assigned a higher priority than data transmission occurring at the background.

Billing management comprises service and user control and personal session control. This block also advantageously comprises authentication of users, provision of a session for the user and control of the user's rights (service profiles) and collection of billing data. Use of other services can be directed to the session in question and services can be controlled and charged through the session. Thus it is possible to provide user-specific services (which can be charged to a certain user). The session control maintains information on the fact that a user contacting from a TCP/IP address is directed to a certain session which comprises certain rights of service and has certain services available. Use of a search robot could be mentioned as an example, i.e. a search robot can be assigned to browse the whole Internet on the basis of certain keywords. It is not necessary, however, to have the expensive radio connection on for the total duration of the search robot's operation, but a short message indicating that the assignment given by the user has been accomplished, for example, can be sent to the user. When the user contacts the Internet for the next time, the session control directs the user to the interrupted session. The session control utilizes the services provided by the message manager 10, for example. The session control is supported by a database which maintains information on the user's rights of service, terminal types, service profiles, etc. and on the services of closed groups (e.g. Centrex).

Local services include local databases and means for developing programs in order to provide and maintain services (Java, ASP, Perl, VBScript).

Compared with the prior art, in which fixedly determined services are provided for the user of a basic mobile station via a short message center, the mechanism of the invention diversifies the supply of services dramatically. Compared with the prior art, in which different application programs are run in (portable) computers which are connected to the telecommunications network via mobile stations, the mechanism of the invention provides an opportunity to use new applications without installing them in the computer. The invention also provides protection against viruses and attacks of other kinds, since according to the invention it is not necessary to change the software of the terminal.

If the invention is implemented in the form of a compact information server IS, as illustrated in FIG. 1, it is not necessary to modify the mobile communications network 2, but the information server IS can be connected to the mobile communications network 2 via standardized interfaces (telecommunications and signalling connections).

By means of the invention it is easy to introduce an Internet connection into existing mobile communications networks and to provide it for the mobile stations which are already in the network and in which no other features except for the short message function are necessary. In principle, a mobile user does not even need to be aware of the fact that the information he asked for is fetched from the Internet. He only sends a request for information in the form of a protocol supported by the mobile station (such as a short message) and receives the requested information in a reply message. When the number of Internet protocols is increased and/or the protocols are updated, the changes are concentrated on the virtual clients 6 of the information server of the invention and protocol layers 7. Terminals 1 need not be modified. A mobile user can access a plurality of services via the same telephone number.

It is obvious to one skilled in the art that as the technology develops, the inventive concept can be implemented in many different ways. Hence the invention and its embodiments are not limited to the above examples, but may vary within the scope of the appended claims.

REFERENCES

1. David R. McClanahan: *Publish Dynamic Applications on the Web*, Databased Wed Advisor, April 1997, pp. 60–65

2. Finnish Patent Application No. 963,659, "Datapalvelu matkaviestinverkossa", filed on 16 Sep., 1996

The invention claimed is:

1. A method for establishing a data connection between a mobile communications system comprising several terminals and another telecommunications system supporting several protocols, the method comprising:
   (i) receiving messages from a terminal, converting them into a format compatible with at least one of the protocols of the other telecommunications system, and transmitting them to the other telecommunications system; and
   (ii) receiving information from the direction of the other telecommunications system and converting it into a format compatible with at least one protocol of the mobile communications system, and transmitting it to the mobile communications system;
   wherein the terminals of the mobile communications system are classified into at least two different classes on the basis of at least one predetermined criterion, wherein the at least one predetermined criterion includes a criterion determined on the basis of the content of a message from a respective terminal among the terminals, and
   the protocol to be used towards the terminal is selected on the basis of the class of the terminal in question, wherein said at least one predetermined criterion includes the terminal's ability to support the HTTP protocol; and information from the direction of the other telecommunications system is transmitted using the HTTP protocol to the terminals supporting it, and as a short message to other terminals.

2. A method according to claim 1, wherein the at least one predetermined criterion includes a criterion determined on the basis of the header of the protocol layer of the message from the terminal.

3. A method according to claim 1, wherein in step (i) at least some messages from the terminal are altered on the basis of a location of said terminal.

4. A method according to claim 3, wherein said location of the terminal is determined on the basis of a location management element of the mobile communications system.

5. A method according to claim 1, wherein in step (ii) at least part of the information to be transmitted to the terminal is selected or filtered on the basis of a location of said terminal.

6. The method according to claim 5, wherein the location of the terminal is determined based on a location management element of the mobile communications system.

7. An information server comprising:

first means for connecting to a mobile communications system, which in turn connects to terminals on a radio connection, second means for connecting to another telecommunications system supporting several protocols, third means which are arranged to receive messages from the terminals and convert them into a format compatible with at least one of the protocols of the other telecommunications system, and to receive information from the direction of the other telecommunications system and to convert it into a format compatible with at least one protocol of the mobile telecommunications system, a function for dividing the terminals into at least two different classes on the basis of at least one predetermined criterion, wherein the at least one predetermined criterion includes a criterion determined on the basis of the content of a message from a respective terminal among the terminals, and a function for selecting the protocol to be used for the connection in the direction towards the respective terminal on the basis of the class of the terminal in question, wherein said at least one criterion comprises the terminal's ability to support the HTTP protocol; and the server further comprises means for sending information from the direction of the other telecommunications system using the HTTP protocol to the terminals supporting it that protocol, and as a short message to other terminals.

8. A server according to claim 7, wherein the server is arranged to compress information from the direction of the telecommunications system before the information is sent as a short message.

9. A server according to claim 7, wherein the server is arranged to analyse the amount and type of information sent from the direction of the other telecommunications system, and if the amount of information exceeds a predetermined threshold value or its type corresponds to a predetermined type, the server is adapted to:

store the information in a memory; and at least first send only a notice to the terminal that the terminal will receive more information when a connection can be established to the terminal via another protocol.

10. A server according to claim 7, wherein the server is arranged to filter the information provided for the terminal on the basis of a location of the terminal.

11. A server according to claim 7, further comprising memory means for storing the most used information from the direction of the other telecommunications system.

12. A server according to claim 7, wherein the server is implemented as a compact network element.

13. A server according to claim 7, wherein the server is implemented in a distributed manner substantially by means of network elements and by supplementing their functions.

14. A server according to claim 7, wherein the server is arranged to be connected to the internet.

15. An information server comprising:

first means for connecting to a mobile communications system, which in turn connects to terminals on a radio connection, second means for connecting to another telecommunications system supporting several protocols, third means which are arranged to receive messages from the terminals and convert them into a format compatible with at least one of the protocols of the other telecommunications system, and to receive information from the direction of the other telecommunications system and to convert it into a format compatible with at least one protocol of the mobile telecommunications system, a function for dividing the terminals into at least two different classes on the basis of at least one predetermined criterion, wherein the at least one predetermined criterion includes a criterion determined on the basis of the content of a message from a respective terminal among the terminals, and a function for selecting the protocol to be used for the connection in the direction towards the respective terminal on the basis of the class of the terminal in question, wherein the server is arranged to send information from the direction of the other telecommunications system to the terminals in several short messages if the content of the information exceeds the length of one short message.

16. An information server comprising:

first means for connecting to a mobile communications system, which in turn connects to terminals on a radio connection, second means for connecting to another telecommunications system supporting several protocols, third means which are arranged to receive messages from the terminals and convert them into a format compatible with at least one of the protocols of the other telecommunications system, and to receive information from the direction of the other telecommunications system and to convert it into a format compatible with at least one protocol of the mobile telecommunications system, a function for dividing the terminals into at least two different classes on the basis of at least one predetermined criterion, wherein the at least one predetermined criterion includes a criterion determined on the basis of the content of a message from a respective terminal among the terminals, and a function for selecting the protocol to be used for the connection in the direction towards the respective terminal on the basis of the class of the terminal in question, wherein the server is arranged to send information from the direction of the other telecommunications system to the terminals in a plurality of short messages, if the content of the information exceeds the length of one short message.

* * * * *